(12) United States Patent
Fujita et al.

(10) Patent No.: US 11,339,686 B2
(45) Date of Patent: May 24, 2022

(54) MOISTURE SEPARATOR AND STEAM TURBINE PLANT

(71) Applicant: Mitsubishi Power, Ltd., Yokohama (JP)

(72) Inventors: Issaku Fujita, Yokohama (JP); Ryota Takahashi, Yokohama (JP); Yasuaki Shimohara, Yokohama (JP); Taichi Nakamura, Yokohama (JP); Tetsuya Tsukamoto, Yokohama (JP)

(73) Assignee: MITSUBISHI POWER, LTD., Yokohama (JP)

( * ) Notice: Subject to any disclaimer, the term of this patent is extended or adjusted under 35 U.S.C. 154(b) by 0 days.

(21) Appl. No.: 17/266,176

(22) PCT Filed: Aug. 19, 2019

(86) PCT No.: PCT/JP2019/032243
§ 371 (c)(1),
(2) Date: Feb. 5, 2021

(87) PCT Pub. No.: WO2020/070987
PCT Pub. Date: Apr. 9, 2020

(65) Prior Publication Data
US 2021/0301682 A1 Sep. 30, 2021

(30) Foreign Application Priority Data
Oct. 2, 2018 (JP) .............................. JP2018-187093

(51) Int. Cl.
*F01K 7/22* (2006.01)
*B01D 45/08* (2006.01)
(52) U.S. Cl.
CPC .............. *F01K 7/223* (2013.01); *B01D 45/08* (2013.01)

(58) Field of Classification Search
CPC ......... F01K 7/223; B01D 45/08; Y02E 30/00; F22B 37/26; G21D 1/02
(Continued)

(56) References Cited

U.S. PATENT DOCUMENTS 3,751,886 A * 8/1973 Sokolowski ........... B01D 45/16
55/318
4,386,583 A * 6/1983 Rabas ..................... F22G 1/005
122/33
(Continued)

FOREIGN PATENT DOCUMENTS

EP 2 947 385 A1 11/2015
EP 3 109 545 A1 12/2016
(Continued)

OTHER PUBLICATIONS

International Search Report dated Oct. 8, 2019, issued in counterpart International Application No. PCT/JP2019/032243, with English translation (2 pages).
(Continued)

*Primary Examiner* — Hoang M Nguyen
(74) *Attorney, Agent, or Firm* — WHDA, LLP

(57) ABSTRACT

The present invention comprises: a cylindrical pipe (314) that has a cylindrical shape about an axis (O) extending in the horizontal direction and has a space internally extending in the direction of the axis (O); steam inlets (31, 32) which are provided at the bottom of the cylindrical pipe (314) and through which steam is introduced; a steam outlet (33) that is opened from an end of the cylindrical pipe (314) in the axis (O) direction toward the axis (O) direction for exhausting steam from the cylindrical pipe (314); and a moisture separation element (315) that is provided in the cylindrical pipe (314) between the steam inlets (31, 32) and the steam
(Continued)

outlet (33) and has a plurality of vanes for separating moisture from steam by passing the steam through the vanes.

7 Claims, 3 Drawing Sheets

(58) Field of Classification Search
USPC .................................. 60/646, 653, 657, 679
See application file for complete search history.

(56) References Cited

U.S. PATENT DOCUMENTS

| | | | | |
|---|---|---|---|---|
| 5,526,386 | A | * | 6/1996 | Tsiklauri ................. G21D 5/16 376/317 |
| 6,810,835 | B2 | | 11/2004 | Ishiguro et al. |
| 2009/0288418 | A1 | * | 11/2009 | Fujita ..................... B01D 45/06 60/657 |
| 2014/0360708 | A1 | | 12/2014 | Padovan et al. |

FOREIGN PATENT DOCUMENTS

| | | |
|---|---|---|
| EP | 3 324 008 A1 | 5/2018 |
| EP | 3 324 009 A1 | 5/2018 |
| EP | 3 346 185 A1 | 7/2018 |
| JP | S63-193515 U | 12/1988 |
| JP | 4369306 A | 12/1992 |
| JP | 5-96708 U | 12/1993 |
| JP | 1061906 A | 3/1998 |
| JP | 2008128573 A | 6/2008 |
| JP | 2009-195854 A | 9/2009 |
| JP | 2012210633 A | 11/2012 |
| JP | 2012255643 A | 12/2012 |
| JP | 2014137188 A | 7/2014 |
| JP | 5619833 B2 | 11/2014 |
| JP | 2015-187436 A | 10/2015 |
| JP | 2017-40198 A | 2/2017 |
| JP | 2017-40200 A | 2/2017 |
| JP | 2017-48969 A | 3/2017 |
| WO | 2017/038322 A1 | 3/2017 |

OTHER PUBLICATIONS

Written Opinion dated Oct. 8, 2019, issued in counterpart Application No. PCT/JP2019/032243, with English Translation (10 pages).

* cited by examiner

MOISTURE SEPARATOR AND STEAM TURBINE PLANT

TECHNICAL FIELD

The present invention relates to a moisture separator and a steam turbine plant.

Priority is claimed on Japanese Patent Application No. 2013-187093 filed on Oct. 2, 2018, the content of which is incorporated herein ay reference.

BACKGROUND ART

A nuclear power generation facility has a steam turbine plant in which steam generated in a steam generator is sent to a steam turbine to perform electric power generation. In such a steam turbine plant, a configuration is common in which after steam sent to a high-pressure turbine passes through the high-pressure turbine, moisture is separated through a moisture separator and reheater, and the steam is then sent to a low-pressure turbine. However, for example, PTL 1 discloses a system in which a high-pressure turbine is divided into a high-pressure turbine and a medium-pressure turbine and moisture is separated between them. Further, the steam that has passed through the low-pressure turbine is cooled in a condenser through a low-pressure moisture separator and reheater to return to a liquid phase, is heated in a feed water heater or the like, and is then sent to a steam generator. Such a steam turbine plant is generally constructed in a single turbine building.

Here, the moisture separator described in PTL 1 has a configuration in which the steam that has flowed into a moisture separation element from a manifold part provided at the center of the inside of a body is discharged through a steam outlet provided in an upper portion of the body.

CITATION LIST

Patent Literature

[PTL 1] Japanese Unexamined Patent Application Publication No. 2017-48969

SUMMARY OF INVENTION

Technical Problem

Incidentally, as described above, since the steam turbine plant is constructed in a single turbine building, there are many restrictions on the layout of the moisture separator of the steam turbine plant.

Therefore, the present invention provides a moisture separator and a steam turbine plant in which the degree of freedom of a layout is improved and compactification is possible.

Solution to Problem

In order to solve the above problem, the present invention adopts the following means.

That is, according to an aspect of the present invention, there is provided a moisture separator including: a cylindrical pipe that has a tubular shape centered on an axis along a horizontal direction and has, in an interior thereof, a space extending in a direction of the axis; a steam inlet provided in a lower portion of the cylindrical pipe and into which steam flows; a steam outlet that is open in the direction of the axis from an end portion in the direction of the axis of the cylindrical pipe to discharge the steam from the cylindrical pipe; and a moisture separation element that is disposed in the cylindrical pipe between the steam inlet and the steam outlet and has a plurality of vanes that separate moisture from the steam by passing the steam through the vanes.

According to this configuration, the steam that has passed through the moisture separation element is discharged from an axial end of the cylindrical pipe by the steam outlet that is open in the direction of the axis of the cylindrical pipe, so that a pipe that is connected to the steam outlet can be extended in the horizontal direction and the degree of freedom of the layout of the moisture separator in a turbine building is increased.

Further, the steam that has passed through the moisture separation element is discharged from the axial end of the cylindrical pipe, so that the steam outlet does not get in the way and the layout of the moisture separation element is less likely to be restricted by the steam outlet. Accordingly, the moisture separation element can be disposed at a position close to the axis in the cylindrical pipe. Therefore, the dimension in an up-down direction of the moisture separation element can be increased as compared with a case where the moisture separation element is disposed at a position away from the axis in the cylindrical pipe. Accordingly, it is not necessary to increase the size of the moisture separator in order to secure a vane area in the moisture separation element, and it is also possible to cope with the restrictions on the layout of each configuration of the steam turbine plant in the turbine building. Further, by avoiding the increase in the size of the moisture separator due to the securement of the vane area, a facility cost can be reduced and a maintainability can be improved.

Further, in the moisture separator described above, the steam outlet may be provided in at least one end portion in the direction of the axis of the cylindrical pipe, a plurality of the moisture separation elements may be disposed so as to face each other with the axis interposed therebetween, a first flow path may be formed between an inner peripheral surface of the cylindrical pipe and the moisture separation element, a second flow path may be formed between the moisture separation elements facing each other with the axis interposed therebetween, and the steam from the steam inlet may flow into the second flow path via the first flow path and be led to the steam outlet.

According to this configuration, since the plurality of moisture separation elements are disposed so as to face each other with the axis interposed therebetween, the vane area in the moisture separation element can be sufficiently secured, and moisture can be efficiently removed from the steam flowing in from the steam inlet without increasing the size of the cylindrical pipe and the steam can be discharged from the steam outlet.

Further, in the moisture separator described above, the steam inlet may be provided between both end portions in the direction of the axis of the cylindrical pipe, the steam outlets may be provided in both end portions in the direction of the axis of the cylindrical pipe, and the moisture separation elements nay be provided on both sides in the direction of the axis in the space with the steam inlet as a reference.

According to this configuration, the steam outlets are provided in both end portions in the direction of the axis of the cylindrical pipe, so that, for example, two moisture separators can be combined into one, and thus the moisture separator can be. made even more compact.

Further, the moisture separator described above may further include a flow distribution member that is provided above the steam inlet, has a guide surface, of which a cross section intersecting the axis follows the inner peripheral surface of the cylindrical pipe, and guides the steam to the first flow path.

According to this configuration, the steam flowing in from the steam inlet collides with the guide surface of the flow distribution member to be divided into two flows with the axis interposed therebetween, and is then led to the first flow path. The steam led to the first flow path passes through the moisture separation element to separate the moisture, is then led to the second flow path, and is discharged from the steam outlet. Therefore, the moisture can be separated even when the steam collides with the guide surface, and the steam flows into each of the moisture separation elements facing each other with the axis interposed therebetween, so that the moisture separation performance of the moisture separator as a whole can be improved.

Further, in the moisture separator described above, the moisture separation elements may be disposed in a plurality of stages above and below the cylindrical pipe.

According to this configuration, the moisture separation elements are disposed in a plurality of stages above and below in the cylindrical pipe, so that the vane area in the moisture separation element can be sufficiently secured, and therefore, moisture can be efficiently separated from the steam.

Further, in a steam turbine plant including a high-pressure turbine, a medium-pressure turbine connected to a low-pressure side of the high-pressure turbine, and a low-pressure turbine connected to a low-pressure side of the medium-pressure turbine, the moisture separator described above may be provided between the high-pressure turbine and the medium-pressure turbine.

Further, according to another aspect of the present invention, there is provided a steam turbine plant including: a first turbine; a second turbine connected to a lower-pressure side of the first turbine; and the moisture separator described above, which is provided between the first turbine and the second turbine, in which steam discharged from the first turbine is introduced into the moisture separator through the steam inlet, and steam discharged from the steam outlet is introduced into the second turbine.

According to this configuration, the steam turbine plant is provided with the moisture separator described above, so that, the degree of freedom of the layout of the moisture separator in the turbine building can be increased and the increase in the size of the moisture separator can be avoided to reduce the facility cost and improve the maintainability.

Advantageous Effects of Invention

According to the moisture separator and the steam turbine plant of the present invention, the degree of freedom of the layout of a pipe that is connected to the moisture separator can be improved and compactification is possible.

DESCRIPTION OF EMBODIMENTS (Overall Configuration)

Hereinafter, an embodiment of the present invention will be described with reference to FIGS. 1 to 5.

Figure 1:
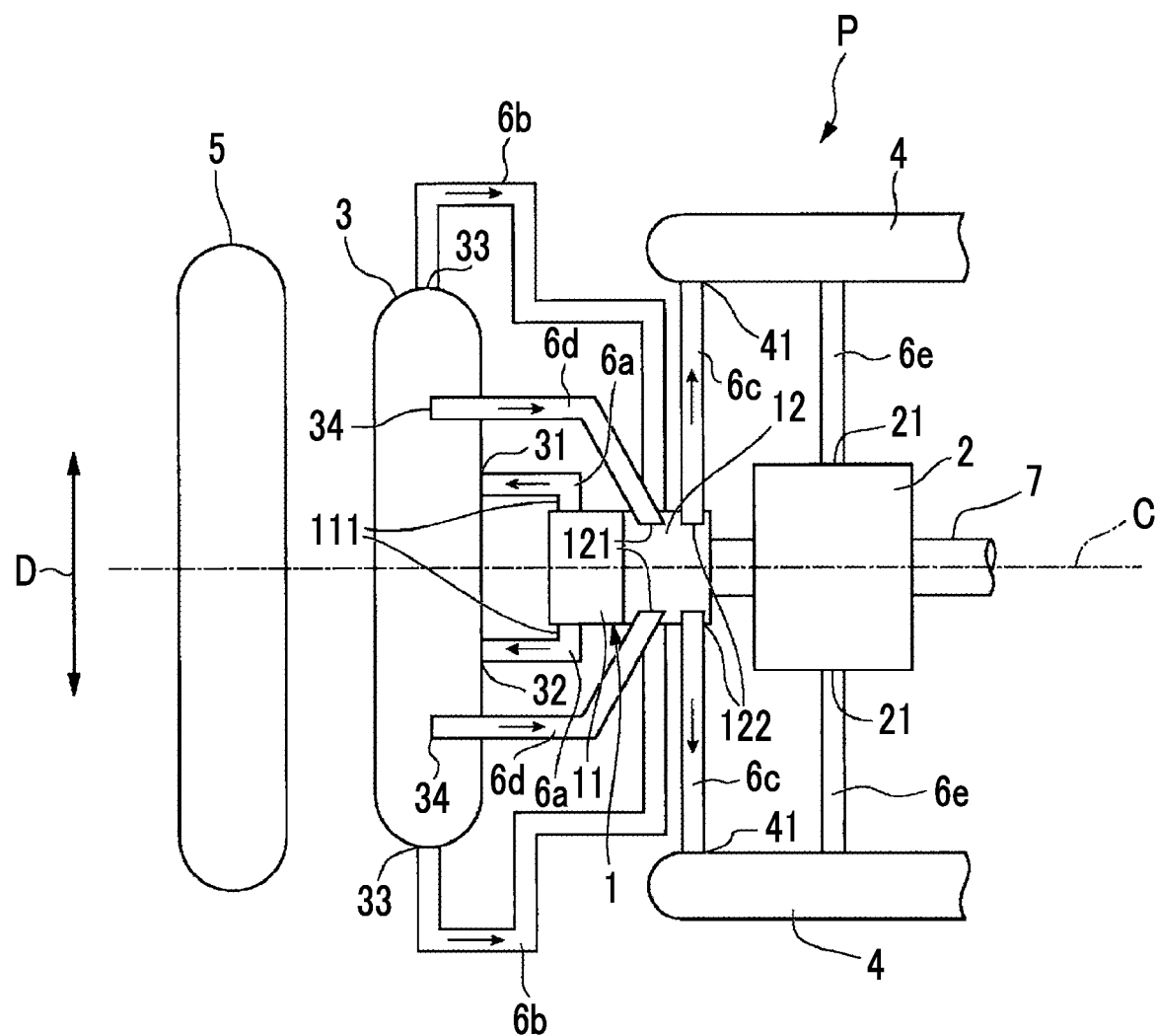
FIG. 1 is a system diagram of a steam turbine plant provided with a moisture separator according to an embodiment of the present invention, as viewed from above.

FIG. 1 is a system diagram of a steam turbine plant P according to an embodiment of the present invention.

The steam turbine plant P according to an embodiment of the present invention is used in, for example, a nuclear power generation facility, and has a high-and-medium pressure turbine 1, a low-pressure turbine 2, a high-pressure moisture separator (a moisture separator) 3, a low-pressure moisture separator and reheater 4, and a deaerator 5 in a turbine building (not shown). The steam from a steam generator (not shown) is introduced into the high-and-medium-pressure turbine 1, and the steam from a high-pressure turbine (a first turbine) 11 in the high-and-medium-pressure turbine 1 is introduced into a medium-pressure turbine (a second turbine) 12 in the high-and-medium-pressure turbine 1 through the high-pressure moisture separator 3. Thereafter, the steam from the medium-pressure turbine 12 is introduced into the low-pressure turbine 2 through the low-pressure moisture separator and reheater 4. The exhaust steam from the low-pressure turbine 2 is condensed in a condenser (not shown), and introduced into the deaerator 5, and then steam is generated in the steam generator and introduced into the high-pressure turbine 11.

The high-and-medium-pressure turbine 1 is composed of the high-pressure turbine 11 and the medium-pressure turbine 12. An inlet of the high-pressure turbine 11 is connected to the steam generator through a pipe. Further, outlets 111 of the high-pressure turbine are connected to a No. 1 steam inlet 31 and a No. 2 steam inlet 32 of the high-pressure moisture separator 3 through pipes 6a. Inlets 121 of the medium-pressure turbine 12 are connected to a No. 1 steam outlet 33 and a No. 2 steam outlet 34 of the high-pressure moisture separator 3 through a pipe 6b and a pipe 6d, and an outlet 122 of the medium-pressure turbine 12 is connected to an inlet 41 of the low-pressure moisture separator and reheater 4 through a pipe 6c.

Figure 2:
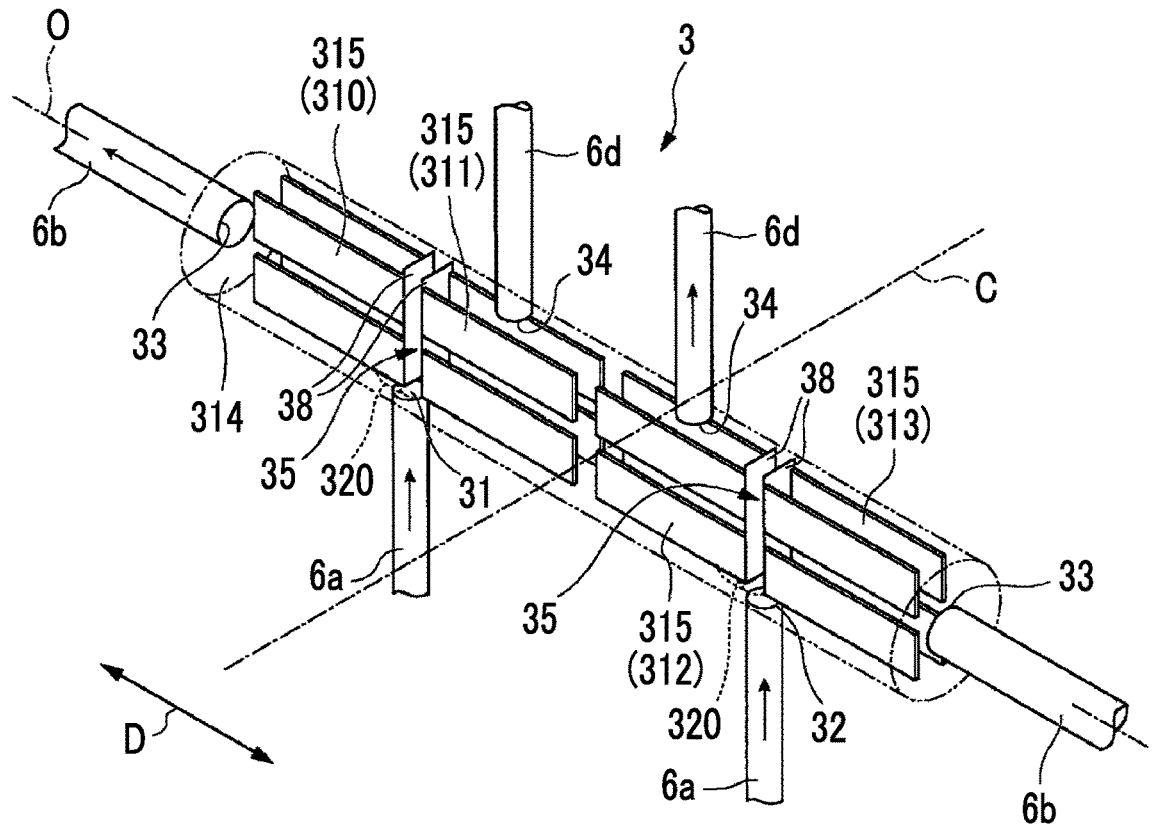
FIG. 2 is a perspective view of the moisture separator according to the embodiment of the present invention.

The outlets 111 of the high-pressure turbine 11 are symmetrically provided at two locations with a center line C, which is a rotation center axis of the high-pressure turbine 11, interposed therebetween in one direction D intersecting (orthogonal to) the center line C, at a lower portion of the high-pressure turbine 11. Then, the No. 1 steam inlet 31 and the No. 2 steam inlet 32 that are open vertically at an interval in one direction D are provided corresponding to the outlets 111 at a lower portion of the high-pressure moisture separator 3, as shown in FIG. 2. The high-pressure moisture separator 3 is disposed in one direction D intersecting the center line C and to cross the center line C with the position of the center line C as the center. In this embodiment, each of the No. 1 steam inlet 31 and the No. 2 steam inlet 32 is connected to the high-pressure moisture separator 3 at an exactly intermediate position between an end portion and the center in one direction D of the high-pressure moisture separator 3.

The No. 1 steam outlets 33 of the high-pressure moisture separator 3 are provided at both end portions in one direction D of the high-pressure moisture separator 3 to be open in one direction D, and are respectively connected to the plurality of inlets 121 of the medium-pressure turbine. Further, the No. 2 steam outlets 34 of the high-pressure moisture separator 3 are provided to be open upward between the center line C and the No. 1 steam inlet 31 and between the center line C and the No. 2 steam inlet 32, and are respectively connected to the plurality of inlets 121 of the medium-pressure turbine 12.

The inlet 121 of the medium-pressure turbine 12 corresponding to the No. 1 steam outlet 33 is provided in a lower portion of the medium-pressure turbine 12, and the No. 1 steam outlet 33 and the inlet 121 of the medium-pressure turbine 12 are connected through the pipe 6b. The inlet 123 of the medium-pressure turbine 12 corresponding to the No. 2 steam outlet 34 is provided in an upper portion of the medium-pressure turbine 12 and is connected to the No. 2 steam outlet 34 through a pipe 6d.

The outlet 122 of the medium-pressure turbine 12 is provided closer to the low-pressure turbine 2 side than the inlet 121 of the medium-pressure turbine 12 at the upper portion of the medium-pressure turbine 12. The two outlets 122 are provided at an interval in one direction D with the center line C interposed therebetween, and are respectively connected to the inlets 43 in the two low-pressure moisture separator and reheaters 4 provided on both sides of the center line C through pipes 6c.

Outlets (not shown) of the low-pressure moisture separator and reheaters 4 are respectively connected to inlets 21 of the low-pressure turbine 2 through pipes 6e. An outlet (not shown) of the low-pressure turbine 2 is connected to the condenser through a pipe.

The high-and-medium-pressure turbine 1 and the low-pressure turbine 2 are connected by a main shaft 7 rotating around the center line C, and the tip of the main shaft 7 is connected to a generator (not shown).

(Moisture Separator)

Hereinafter, the high-pressure moisture separator 3 will be described in detail.

As shown in FIGS. 2 to 5, the high-pressure moisture separator 3 according to this embodiment includes a cylindrical pipe 314, a plurality of moisture separation elements 315, a partition plate 38, a division plate 39, a spacer 316, a seal member 217, and a flow distribution member 320.

(Cylindrical Pipe)

The cylindrical pipe 314 extends along the horizontal direction and in a direction of an axis O (one direction D) intersecting (orthogonal to) the center line C and is formed in a hollow. As shown in FIG. 2, the No. 1 steam inlet 31, the No. 2 steam inlet 32, the No. 1 steam outlet 33, and the No. 2 steam outlet 34 are formed in the cylindrical pipe 314, as described above. The No. 1 steam inlet 31 and the No. 2 steam inlet 32 are provided to communicate with the inside of the cylindrical pipe 314, so that steam can be introduced into the cylindrical pipe 314. Steam can be discharged from the No. 1 steam outlet 33 and the No. 2 steam outlet 34 to the outside of the cylindrical pipe 314.

(Moisture Separation Element)

A plurality of moisture separation elements 315 are provided side by side in the direction of the axis O inside the cylindrical pipe 314. Specifically, the moisture separation elements 315 are arranged on both sides in the direction of the axis O with the No. 1 steam inlet 31 as the reference and on both sides in the direction of the axis O with the No. 2 steam inlet 32 as the reference. The moisture separation elements 315 are provided in a plurality of stages (in this embodiment, two stages, but three or more stages are acceptable) in the up-down direction. The two-stage moisture separation elements 315 provided in the up-down direction are provided 30 as to face each other in the up-down direction with the axis O interposed therebetween, and the moisture separation elements 315 are provided to be paired at an interval in the direction of the center line C and provided to face each other in the direction of the center line C. Each of the plurality of moisture separation elements 315 has a rectangular plate shape and is disposed such that the surface thereof faces in the direction of the center line C and the longitudinal direction thereof is along the direction of the axis O.

Each of the moisture separation elements 315 has a structure in which corrugated separator vanes are laminated at predetermined intervals.

Hereinafter, as shown in FIG. 2, in the direction of the axis O which is the longitudinal direction of the cylindrical pipe 314, groups of the moisture separation elements 315 from one of the No. 1 steam outlet 33 toward the other of the No. 1 steam outlets 33 are referred to as a first moisture separation element group 310, a second moisture separation element group 311, a third moisture separation element group 312, and a fourth moisture separation element group 313. The No. 1 steam inlet 31 is disposed between the first moisture separation element group 310 and the second moisture separation element group 311, and the No. 2 steam inlet 32 is disposed between the third moisture separation element group 312 and the fourth moisture separation element group 313.

The No. 2 steam outlet 34 is provided to be open at the upper portion of the cylindrical pipe 314 corresponding to the center position in the direction of the axis O of each of the second moisture separation element group 313 and the third moisture separation element group 312.

Figure 3:
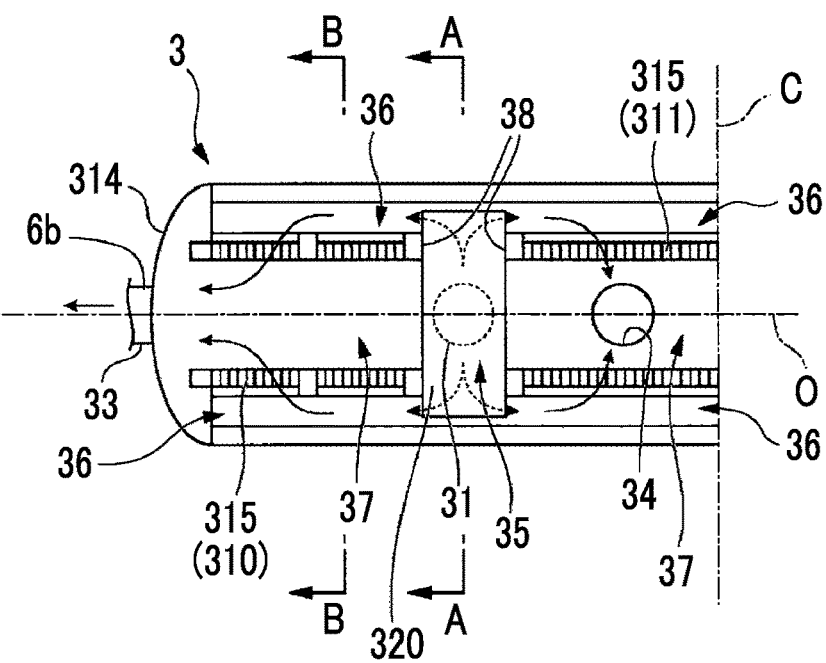
FIG. 3 is a longitudinal, sectional view including an axis of the moisture separator according to the embodiment of the present invention when the moisture separator is viewed from above.
Figure 4:
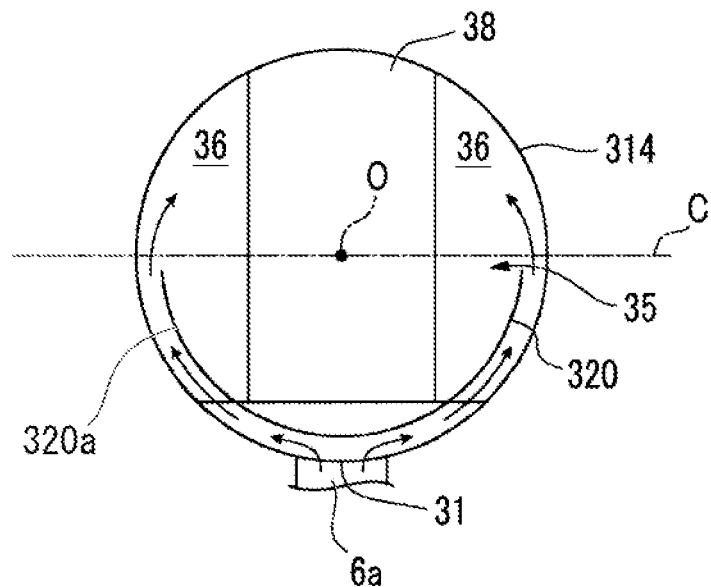
FIG. 4 is a cross-sectional view orthogonal to the axis of the moisture separator according to the embodiment of the present invention and is a view corresponding to a cross section taken along line a-a of a structure shown in FIG. 3.
Figure 5:
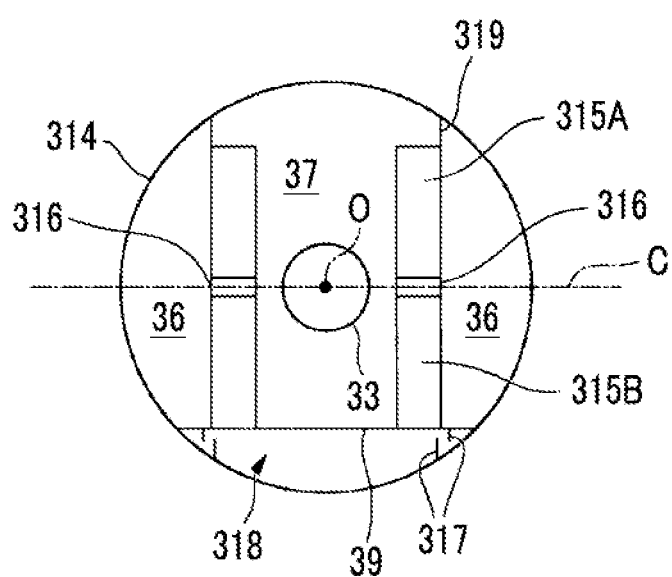
FIG. 5 is a cross-sectional view orthogonal to the axis of the moisture separator according to the embodiment of the present invention and is a view corresponding to a cross section taken along line S-B of a structure shown in FIG. 3.

In this way, as shown in FIGS. 3 to 5, first flow paths 36 each having a semilunar-shaped cross section and extending in the direction of the axis O, through which steam flows, are partitioned to be paired at an interval in the direction of the center line C between the inner peripheral surface of the cylindrical pipe 314 and the plurality of moisture separation elements 315. Further, a second flow path 37 is partitioned between the plurality of moisture separation elements 315 facing each other in the direction of the center line C with the axis O interposed therebetween. The steam passes through the moisture separation element 315 while moving in the direction of the axis O in the first flow path 36, is led to the second flow path 37, and is discharged from the No. 1 steam outlet 33 and the No. 2 steam outlet 34, so that moisture is removed when the steam passes through the moisture separation element. Here, since the first flow path 36 only needs to have a property of leading the steam flowing through the flow path to the second flow path 37, the first flow path 36 does not need to be formed necessarily in a semilunar shape, and the first flow path 36 only needs to be formed such that the steam passes through the moisture separation element 315 when the steam flows from the first flow path 36 to the second flow path 37.

(Partition Plate)

The partition plate 38 is provided at each end portion facing the No. 1 steam inlet 31, of the first moisture separation element group 310 and the second moisture separation element group 311. Further, the partition plate 38 is provided at each end portion facing the No. 2 steam inlet 32, of the third moisture separation element group 312 and the fourth moisture separation element group 313. On the other hand, the partition plate 38 is not provided at the end portion facing the No. 1 steam outlet 33 in the first moisture separation element group 310 and the end portion facing the No. 1 steam outlet 33 in the fourth moisture separation element group 313. Similarly, the partition plate 38 is also not provided at the position where the second moisture separation element group 311 and the third moisture separation element group 312 face each other.

As shown in FIG. 4, the partition plate 38 is provided over the up-down direction of the cylindrical pipe 314 inside the cylindrical pipe 314 so as to cover all the end portions of the moisture separation elements 313 of the two upper and lower stages. In this way, a steam inlet chamber 35 communicating with the No. 1 steam inlet 31 and the No. 2 steam inlet 32 is partitioned inside the cylindrical pipe 314. The steam flowing in from the No. 1 steam inlet 31 and the No. 2 steam inlet 32 flows from the steam inlet chamber 35 toward the first flow path 36.

(Division Plate)

As shown in FIG. 5, the division plate 39 extending in the direction of the axis O is provided inside the cylindrical pipe 314. A lower end of a lower moisture separation element 315B among the plurality of moisture separation elements 315 disposed above and below is fixed onto the division plate 39. The division plate 39 is disposed below the axis O inside the cylindrical pipe 314, and partitions a drain flow path 318 having a semilunar-shaped cross section, through which a drain flows, between itself and the inner peripheral surface of the cylindrical pipe 314.

Further, the spacer 316 is provided between a lower end of an upper moisture separation element 315A and an upper end of the moisture separation element 315B to support the moisture separation elements 315A and 315B. In addition, an upper end of the moisture separation element 315A is supported on the inner peripheral surface of the cylindrical pipe 314 by a fixing member 319. Here, the fixing between the upper moisture separation element 315A and the lower moisture separation element 315B does not need to be performed necessarily by using the spacer 316.

A labyrinth-shaped seal member 317 that is provided so as to protrude downward from the lower surface of the division plate 39 and upward from the inner peripheral surface of the cylindrical pipe 314 to prevent the inflow of steam into the drain flow path 318 is provided in the drain flow path 318 between the division plate 39 and the inner peripheral surface of the cylindrical pipe 314. The drain is discharged to the outside from a drain discharge port (not shown) provided in communication with the drain flow path 318.

(Flow Distribution Member)

As shown in FIG. 2, FIG. 3, and FIG. 4, the flow distribution members 320 are provided inside the cylindrical pipe 314 so as to face the No. 1 steam inlet 31 and the No. 2 steam inlet 32. More specifically, the flow distribution member 320 has a guide surface 320a that has a curved shape following the inner peripheral surface of the cylindrical pipe 314 and extends toward the center line C. The flow distribution members 320 are disposed above the first and No. 2 steam inlets 31 and 32 at an interval in the up-down direction from the No. 1 steam inlet 31 and the No. 2 steam inlet 32, and fixed to the inner peripheral surface of the cylindrical pipe 314.

The guide surface 320a divides the flow of the steam from each of the No. 1 steam inlet 31 and the No. 2 steam inlet 32 so as to be separated from the axis O to the outer side in a radial direction of the cylindrical pipe 314 when the steam is led to the steam inlet chamber 35, and then guides the steam to the pair of first flow paths 36.

(Operation and Effects)

Next, the operation of the high-pressure moisture separator 3 of this embodiment will be described.

In the steam turbine plant P having the above configuration, the water sent from the deaerator 5 becomes heated steam in the steam generator, and the heated steam is sent, to the inlet of the high-pressure turbine to perform work, then sent from the outlet 111 of the high-pressure turbine to the high-pressure moisture separator 3 through the pipe 6a, and sent to the inlet 121 of the medium-pressure turbine after the moisture is removed.

As shown in FIG. 4, in the high-pressure moisture separator 3, the steam flowing from the No. 1 steam inlet 31 and the No. 2 steam inlet 32 into the steam inlet chamber 35 collides with the flow distribution member 320, thereby being guided to the guide surface 320a to flow into each of the pair of first flow paths 36. The steam that has flowed into the first flow path 36 flows through the first flow path 36 in the direction of the axis O. Thereafter, the steam flows from the first flow path 36 toward the inner side in the radial direction of the cylindrical pipe 314.

At this time, the steam passes through the moisture separation element 315 provided at the boundary between the first flow path 36 and the second flow path 37. Then, the moisture contained in the steam becomes a drain at the moisture separation element 315, and thus the moisture can be removed from the steam. The two steam flows obtained by dividing the steam by the flow distribution member 320 pass through the first moisture separation element group 310 and the fourth moisture separation element group 313, and then merge with each other in the second flow path 37, and the merged steam flow moves in the direction of the axis O in the second flow path 37 and is discharged to the outside from the No. 1 steam outlets 33 provided at both ends in the longitudinal direction of the cylindrical pipe 314. Further, the two steam flows obtained by dividing the steam by the flow distribution member 320 pass through the second moisture separation element group 311 and the third moisture separation element group 312, and then merge with each other in the second flow path 37, and the merged steam flow is discharged to the outside from the No. 2 steam outlet 34 provided in the upper portion of the cylindrical pipe 334.

The drain generated when the moisture is removed from the steam drips downward inside the cylindrical pipe 314, thereby being led to the drain flow path 319, and is discharged from the drain discharge port (not shown) to the outside of the cylindrical pipe 314.

According to the steam turbine plant P of this embodiment, due to a configuration made such that the steam that has passed through the moisture separation element 315 is discharged from the axial ends of the cylindrical pipe 314 through the steam outlet 33 that are open in the direction of the axis O of the cylindrical pipe 314, the pipes 6b which are connected to the steam outlet 33 can be extended in the horizontal direction, and the degree of freedom of the layout of the pipes 6b in the turbine building is increased.

Further, due to a configuration made such that the steam that has passed through the moisture separation element 315 is discharged from the axial ends of the cylindrical pipe 314 through the steam outlet 33 that are open in the direction of the axis O of the cylindrical pipe 314, the layout of the moisture separation element 315 is less likely to be restricted by the steam outlet 33. Specifically, due to a configuration made such that the steam that has passed through the moisture separation element 315 is discharged from the axial ends of the cylindrical pipe 314, the moisture separation element 315 can be disposed closer to the inner side in the radial direction in the cylindrical pipe 314, and the first flow path 36, which is a flow path causing steam to flow into the moisture separation element 315, can be disposed at the outer side in the radial direction in the cylindrical pipe 314.

The moisture separation element 315 can be disposed at a position closer to the axis O at the inner side in the radial direction inside the cylindrical pipe 314, so that the dimension in the up-down direction of the moisture separation element 315 can be increased as compared with a case where the moisture separation element 314 is disposed at a position away from the axis O in the cylindrical pipe 314, that is, closer to the outer side in the radial direction in the cylindrical pipe 314. Accordingly, it is not necessary to increase the size or the cylindrical pipe 314 in order to secure the vane area in the moisture separation element 315, and it is possible to cope with the restrictions on the layout of each configuration of the steam turbine plant P in the turbine building. Further, the high-pressure moisture separator 3 can be made compact by securing the vane area, the facility cost can be reduced, and the maintainability can be improved.

Further, in this embodiment, the steam outlet 33 are provided at both end portions in the direction of the axis O of the cylindrical pipe 314, so that such a shape that two moisture separators are combined into one is obtained. That is, it is possible to combine two moisture separators into one, and thus it is also possible to make the moisture separator 3 even more compact. Accordingly, the steam turbine plant P can be made even more compact.

Further, in this embodiment, the plurality of moisture separation elements 315 are disposed so as to face each other with the axis O interposed therebetween, and are disposed in two stages above and below in the cylindrical pipe 314, so that the vane area in the moisture separation element 315 can be sufficiently secured. Accordingly, moisture can be efficiently removed from the steam flowing in from the steam inlets 31 and 32 without increasing the size of the cylindrical pipe 314, and the steam can be discharged from the steam outlets 33 and 34.

Further, the steam flowing in from the steam inlets 31 and 32 collides with the guide surface 320a of the flow distribution member 320, and is then divided into two flows with the axis O interposed therebetween, and then the flows are led to the first flow paths 36. Therefore, the moisture can be separated even when the steam collides with the flaw distribution member 320, and the steam is allowed to flow into each of the moisture separation elements 315 facing each other in the direction of the center line C with the axis O interposed therebetween, so that the moisture separation performance of the high-pressure moisture separator 3 as a whole can be improved.

In this embodiment, the flow distribution member 320 does not need to be necessarily provided. Further, the guide surface 320a of the flow distribution member 320 does not need to be formed necessarily in a curved shape along the inside of the cylindrical pipe 314, and the guide surface 320a may be flat, for example.

Although the embodiment of the present invention has been described in detail above with reference to the drawings, the specific configuration is not limited to the embodiment, and also includes a design change and the like within a scope which does not depart from the gist of the present invention.

For example, the No. 1 steam outlets 33 of the high-pressure moisture separator 3 do not need to be opened necessarily at both end portions of the axis O in the high-pressure moisture separator 3, and may be opened only at an end portion on one side.

Further, the steam turbine plant P described above is not always applied only to a nuclear power generation facility and can also be applied to, for example, a thermal power generation facility.

INDUSTRIAL APPLICABILITY

The present invention is applicable to moisture separators and steam turbine plants.

REFERENCE SIGNS LIST

1: high-and-medium-pressure turbine
2: low-pressure turbine
3: high-pressure moisture separator
4: low-pressure moisture separator and reheater
5: deaerator
6a, 6b, 6c, 6d, 6e: pipe
7: main shaft
11: high-pressure turbine (first turbine)
12: medium-pressure turbine (second turbine)
21: inlet of low-pressure turbine
31: No. 1 steam inlet
32: No. 2 steam inlet
33: No. 1 steam outlet
34: No. 2 steam outlet
35: steam inlet chamber
36: first flow path
37: second flow path
38: partition plate
39: division plate
41: inlet of low-pressure moisture separator and reheater
111: outlet of high-pressure turbine
121: inlet of medium-pressure turbine
122: outlet of medium-pressure turbine
310: first moisture separation element group
311: second moisture separation element group
312: third moisture separation element group
313: fourth moisture separation element group
314: cylindrical pipe
315: moisture separation element
315A: upper moisture separation element
315B: lower moisture separation element
316: spacer
317: seal member
318: drain flow path
319: fixing member
320: flow distribution member
321: partition plate
P: steam turbine plant

The invention claimed is:

1. A moisture separator comprising:
a cylindrical pipe that has a tubular shape centered on an axis along a horizontal direction and has, in an interior thereof, a space extending in a direction of the axis;
a steam inlet provided at a lower portion of the cylindrical pipe in a vertical direction orthogonal to the axis and into which steam flows;
a steam outlet that is open in the direction of the axis from an end portion in the direction of the axis of the cylindrical pipe to discharge the steam from the cylindrical pipe; and
a moisture separation element that is disposed in the cylindrical pipe between the steam inlet and the steam outlet and has a plurality of vanes that separate moisture from the steam by passing the steam through the vanes.

2. The moisture separator according to claim 1, wherein the steam outlet is provided in at least one end portion in the direction of the axis of the cylindrical pipe,
- a plurality of the moisture separation elements are disposed so as to face each other with the axis interposed therebetween,
- a first flow path is formed between an inner peripheral surface of the cylindrical pipe and the moisture separation element,
- second flow path is formed between the moisture separation elements facing each other with the axis interposed therebetween, and
- the steam from the steam inlet flows into the second flow path via the first flow path and is led to the steam outlet.

3. The moisture separator according to claim 2, wherein the steam inlet is provided between both end portions in the direction of the axis of the cylindrical pipe,
- the steam outlets are provided in both end portions in the direction of the axis of the cylindrical pipe, and
- the moisture separation elements are provided on both sides in the direction of the axis in the space with the steam inlet as a reference.

4. The moisture separator according to claim 2, further comprising:
- a flow distribution member that is provided above the steam inlet, has a guide surface, of which a cross section intersecting the axis follows the inner peripheral surface of the cylindrical pipe, and guides the steam to the first flow path.

5. The moisture separator according to claim 1, wherein, in an inside of the cylindrical pipe, the moisture separation elements are disposed in a plurality of stages on an upper side opposite to the steam inlet and on a lower side on the steam inlet side.

6. The moisture separator according to claim 1, wherein in a steam turbine plant including a high-pressure turbine, a medium-pressure turbine connected to a low-pressure side of the high-pressure turbine, and a low-pressure turbine connected to a low-pressure side of the medium-pressure turbine,
- the moisture separator is provided between the high-pressure turbine and the medium-pressure turbine.

7. A steam turbine plant comprising:
- a first turbine;
- a second turbine connected to a lower-pressure side of the first turbine; and
- the moisture separator according to claim 1, which is provided between the first turbine and the second turbine,
- wherein steam discharged from the first turbine is introduced into the moisture separator through the steam inlet, and steam discharged from the steam outlet is introduced into the second turbine.

* * * * *